(12) United States Patent
Huang et al.

(10) Patent No.: US 8,207,252 B2
(45) Date of Patent: Jun. 26, 2012

(54) MOISTURE-CURABLE SILYLATED POLYMER RESIN COMPOSITION

(75) Inventors: Misty W. Huang, New City, NY (US); Jeries I. Nesheiwat, Yonkers, NY (US)

(73) Assignee: Momentive Performance Materials Inc., Albany, NY (US)

( * ) Notice: Subject to any disclaimer, the term of this patent is extended or adjusted under 35 U.S.C. 154(b) by 841 days.

(21) Appl. No.: 11/715,000

(22) Filed: Mar. 7, 2007

(65) Prior Publication Data

US 2008/0221245 A1   Sep. 11, 2008

(51) Int. Cl.
*C08F 255/02* (2006.01)
*C08F 263/04* (2006.01)
*C08L 51/00* (2006.01)

(52) U.S. Cl. ............ 524/261; 524/263; 525/63; 525/71; 525/72; 525/100; 525/342

(58) Field of Classification Search .................. 524/262, 524/263, 264; 525/100, 101, 102, 185, 326.1, 525/342, 330.3; 528/26, 28
See application file for complete search history.

(56) References Cited

U.S. PATENT DOCUMENTS

| | | | |
|---|---|---|---|
| 3,028,367 A | 4/1962 | O'Brien | |
| 4,130,535 A | 12/1978 | Coran et al. | |
| 4,491,650 A | 1/1985 | Rizk et al. | |
| 5,118,752 A | 6/1992 | Chang et al. | |
| 5,252,660 A | 10/1993 | Hazan et al. | |
| 5,302,669 A | 4/1994 | Furukawa et al. | |
| 5,705,561 A * | 1/1998 | Kozakiewicz et al. | ........ 524/730 |
| 5,767,197 A * | 6/1998 | Fukatsu et al. | ................ 525/101 |
| 5,990,257 A | 11/1999 | Johnston et al. | |
| 6,140,393 A | 10/2000 | Bomal | |
| 6,140,447 A | 10/2000 | Gay et al. | |
| 6,197,912 B1 | 3/2001 | Huang et al. | |
| 6,245,834 B1 | 6/2001 | Bomal et al. | |
| 6,271,331 B1 | 8/2001 | Gay et al. | |
| 2006/0173121 A1 | 8/2006 | Tamai | |

FOREIGN PATENT DOCUMENTS

| | | |
|---|---|---|
| DE | 10 2004 055450 A | 5/2006 |
| EP | 0 732 348 A | 9/1996 |
| EP | 1 557 455 A | 7/2005 |
| JP | 07 011 223 | 1/1995 |
| WO | WO 99/40140 A | 8/1999 |
| WO | 99 54386 | 10/1999 |

* cited by examiner

*Primary Examiner* — Irina S Zemel
*Assistant Examiner* — Jeffrey Lenihan
(74) *Attorney, Agent, or Firm* — Dominick G. Vicari; Joseph S. Ostroff

(57) ABSTRACT

The present invention provides a moisture-curable composition containing silylated polyurethane prepolymer and silane acrylate polymer. The composition is flowable at room temperatures, and upon curing forms high modulus resins for use in adhesives, coatings and sealants for automotive and industrial applications.

34 Claims, No Drawings

MOISTURE-CURABLE SILYLATED POLYMER RESIN COMPOSITION

FIELD OF THE INVENTION

The present invention relates generally to moisture-curable composition of silylated polymer resins for use in adhesives and sealants. More particularly, the present invention relates to a composition containing silylated polyurethane or polyether prepolymer and silylated acrylate polymer resins that are liquid at room temperature and upon curing provide high modulus products.

BACKGROUND OF THE INVENTION

Prior art high modulus polyurethane resins typically have high viscosities and are waxy solids at room temperature. Due to these properties it is inconvenient to use these high modulus resins for non-hot melt adhesives.

Polyurethane and acrylic copolymers compositions are know in the art. For example, Kanegafuchi, JP 07011223, discloses a polyurethane and acrylic copolymer for preparing coating primer. Kanegafuchi discloses silane-acrylic copolymers prepared by co-polymerizing methacryloxysilanes.

Silane-modified acrylic polymers are also known in the art. For example, Essex, U.S. Pat. No. 4,491,650, discloses silane-modified acrylic polymers for use in primers. These polymers are unsuitable for use as adhesives because they are brittle.

Published U.S. Patent Application No. 2006/0173121 discloses a curable composition containing silylated polyoxyalkylene polymer, copolymers of methacryloxysilane and acrylic acid alkyl ester monomers and an ionic surfactant. However, the glass transition temperatures for these copolymers must be lower than 0° C. for flexibility.

Most one-part high modulus silane-terminated polymer resins or resin blends are either waxy or highly viscous at room temperature due to the semi-crystallinity of the polymers used or strong internal interactions.

There remains a need in the industry for curable silane-terminated resins for use in non-hot-melt adhesives which are flowable at room temperature and cure into high modulus products. The present invention, as described more fully herein, provides such compositions.

SUMMARY OF THE INVENTION

The present invention provides a moisture-curable silylated polymer resin composition comprising:

a) non-acrylic polymer containing at lease one hydrolysable silyl group that is bonded to the polymer chain through an ether (—O—) linking group or a carbonyl linking group in which the carbonyl is bonded to heteratoms selected from the group consisting of oxygen, nitrogen and sulfur, with the proviso that at least one heteroatom is nitrogen;

b) silylated acrylate polymer, the polymer possessing at least one hydrolysable silyl group that is bonded to the polymer through a urethane ((—)$_2$N(C=O)O—) linking group; and, optionally, c) at least one hydrolysable silicon compound.

The composition of the present invention is clear and flowable at room temperatures, and upon curing forms high modulus resin compounds with excellent elongation which are suitable for adhesives, pressure sensitive adhesives, coating and sealants for use in, e.g., automotive and industrial applications.

DETAILED DESCRIPTION OF THE INVENTION

The present invention provides a curable composition which comprises a non-acrylic polymer containing at least one hydrolysable silyl group that is bonded to the polymer chain through an ether (—O—) linking group or carbonyl linking group, in which the carbonyl is bonded to heteroatoms selected from the group consisting of oxygen, nitrogen and sulfur, with the proviso that at least one heteroatom is nitrogen, i.e., component (a), and a silylated acrylate polymer, i.e., component (b), which contains at least one hydrolysable silyl group that is bonded to the polymer through a urethane ((—)$_2$N(C=O)O—) linking group. Component (a) has glass transition temperature (Tg) of about −20° C. or lower to provide flexibility, and the component (b) has a glass transition temperature (Tg) of about 1° C. or higher to provide increased strength.

In one embodiment of the present invention component (a) has the general Formula (1):

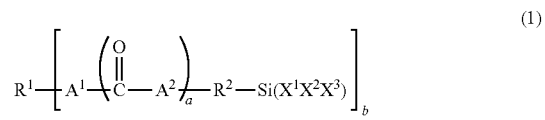

wherein $R^1$ is a monovalent or polyvalent organic polymer fragment having an number average molecular weight of from about 500 to about 25,000 grams/mole;

each occurrence of $R^2$ is independently a divalent hydrocarbyl group containing from 1 to 12 carbon atoms which is selected from the group consisting of divalent alkylene, alkenylene, arenylene, arylene and aralkylene, and, optionally, contains at least one heteroatom selected from the group consisting of oxygen, nitrogen and sulfur;

each occurrence of $A^1$ is independently selected from divalent oxygen (—O—), sulfur (—S—) or substituted nitrogen of the structure (—)$_2$NR$^3$, wherein $R^3$ is hydrogen, alkyl, alkenyl, arenyl, aryl, aralkyl or —R$^2$SiX$^1$X$^2$X$^3$ group, wherein each $R^3$, other than hydrogen, contains from 1 to 18 carbon atoms, and with the provisos that when $A^1$ is oxygen or sulfur, then $A^2$ is (—)$_2$NR$^3$ and when a is 0, then $A^1$ is oxygen;

each occurrence of $A^2$ is independently selected from divalent oxygen (—O—), sulfur (—S—) or substituted nitrogen of the structure (—)$_2$NR$^3$, wherein $R^3$ is hydrogen, alkyl, alkenyl, arenyl, aryl, aralkyl or —R$^2$SiX$^1$X$^2$X$^3$ group, wherein each $R^3$, other than hydrogen, contains from 1 to 18 carbon atoms, and with the provisos that when $A^2$ is oxygen or sulfur, then $A^1$ is (—)$_2$NR$^3$;

each occurrence of $X^1$ is independently selected from the group consisting of RO—, RC(=O)O—, R$_2$C=NO—, and R$_2$NO— wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom;

each occurrence of $X^2$ and $X^3$ is independently selected from the group consisting of RO—, RC(=O)O—, R$_2$C=NO—, R$_2$NO— and R wherein each R is independently selected from the group consisting of hydrogen, alkyl, alkenyl, arenyl, aryl, and aralkyl, wherein each R, other than hydrogen, contains from 1 to 18 carbon atoms and, optionally, contains at least one oxygen or sulfur atom; and, each occurrence of subscripts a and b is independently an integer wherein a is 0 or 1 and b is 1 to 6.

As used herein, "alkyl" includes straight, branched and cyclic alkyl groups; "alkenyl" includes any straight, branched, or cyclic alkenyl group containing one or more carbon-carbon double bonds, where the point of substitution can be either at a carbon-carbon double bond or elsewhere in the group; "aryl" includes any aromatic hydrocarbon from which one hydrogen atom has been removed; "aralkyl" includes, but is not limited to, any of the aforementioned alkyl groups in which one or more hydrogen atoms have been substituted by the same number of like and/or different aryl (as defined herein) substituents; and "arenyl" includes any of the aforementioned aryl groups in which one or more hydrogen atoms have been substituted by the same number of like and/or different alkyl (as defined herein) substituents.

Specific examples of alkyls include, but are not limited to, methyl, ethyl, propyl and isobutyl. Specific examples of alkenyls include, but are not limited to, vinyl, propenyl, allyl, methallyl, ethylidenyl norbornane, ethylidene norbornyl, ethylidenyl norbornene and ethylidene norbornenyl. Specific examples of aryls include, but are not limited to, phenyl and naphthalenyl. Specific examples of aralkyls include, but are not limited to, benzyl and phenethyl. Specific examples of arenyls include, but are not limited to, tolyl and xylyl.

The term "silylated acrylic polymer," as used herein, refers to acrylic polymers possessing at least one hydrolysable silyl group that is bonded to the polymer through a urethane linking group. The term "silylated non-acrylic polymer," as used herein, refers to non-acrylic polymer containing at lease one hydrolysable silyl group that is bonded to the polymer chain through an ether (—O—) linking group or a carbonyl linking group in which the carbonyl is bonded to heteratoms selected from the group consisting of oxygen, nitrogen and sulfur, with the proviso that at least one heteroatom is nitrogen.

According to one embodiment of the invention, component (a) can be prepared from a polyol reactant or a combination of polyol reactants. Combinations or mixtures of polyol reactants are often used to achieve specific physical properties of the moisture-cured polymer resin, such as flowability, tensile, modulus and adhesion. In one embodiment, the number average molecular weight of the polyol reactant is specifically from about 300 to about 24,000 grams per mole, and more specifically from about 1,000 to 20,000 grams per mole. These polyols optionally contain other organic functional groups, including the non-limiting examples of urethane, thiourethane, urea, biuret, ester, thioester, ether, thioether, amide, and the like.

In another embodiment, a non-acrylic polymer of the present invention containing one silyl group can be used in combination with non-acrylic polymer of the present invention containing two or more silyl groups to lower the Tg and increase the flexibility of component (a). The non-acrylic polymer containing one silyl group functions as a reactive plasticizer that becomes incorporated into the polymer network during cure. However, if the average hydroxyl-functionality polyol mixture is too low, then the moisture-curable silylated polymer resin composition may cure poorly. It is, therefore, preferable to have sufficient average functionality in the reactant polyols, such that component (a) prepared from them cures on exposure to moisture. The average hydroxyl-functionality of the polyol reactant mixture is specially from about 1.6 to about 6.0 hydroxyl group per polyol molecule, more specifically from about 1.8 to about 3.0 hydroxyl group per polyol molecule and most specifically, from about 1.95 to about 2.5 hydroxyl groups per polyol molecule.

In still another embodiment of the invention, blending a low number average molecular weight polyol reactant of the present invention with a high number average molecular weight polyol reactant of the present invention increases the modulus of component (a), after cure at low strains, while maintaining high values for elongations at break. The number average molecular weight of the low molecular weight polyol is specifically from about 300 to about 2,000 grams per mole, more specifically from about 500 to about 1,200 grams per mole and most specifically from about 800 to about 1,000 grams per mole. The number average molecular weight of the high molecular weight polyol is specifically from about 2,000 to about 24,000 grams per mole, more specifically from about 4,000 to about 12,000 grams per mole and most specifically from about 8,000 to about 10,000 grams per mole. The weight ratio of low molecular weight polyol reactant to high molecular weight polyol reactant is specifically from about 0.01 to about 3, more specifically from about 0.05 to about 1 and most specifically from about 0.2 to about 0.5.

Representative non-limiting examples of polyols include hydroxyl-terminated polyalkylene oxides, such as hydroxyl-terminated polypropylene oxide, hydroxyl-terminated polyethylene oxide, and hydroxyl-terminated polybutylene oxide; polyoxyalkylene triols; polycaprolactone diols and triols; hydroxyl terminated unsaturated rubbers, such as hydroxyl-terminated polybutane diene copolymer; polyester diols and polyol made from saturated aliphatic diacids and diols or triols, unsaturated diacids and diols or triols, saturated polyacids and diols or aromatic diacids and diols or triols and the like; polytetramethylene glycols; and other diols or triols which have Tg lower than −20° C.

In one embodiment of the present invention, the polyols employed have a very low unsaturation level and therefore high functionality. Said polyols are typically prepared using metal complex catalysts for the polymerization of alkylene oxide resulting in polyols having a low level of terminal ethylenic unsaturation. In one embodiment of the present invention the polyols have a terminal ethylenic unsaturation that is specifically less than about 0.4 milliequivalents per gram (meq/g) of polyol. In another embodiment of the invention, the terminal ethylenic unsaturation is less than about 0.1 milliequivalents per gram (meq/g) of polyol, and in yet another embodiment the terminal ethylenic unsaturation is less than about 0.02 milliequivalents per gram (meq/g) of polyol. The number average molecular weight of the polyols is specifically in the range between from about 500 and about 24,000 grams per mole (g/mol), and more specifically from about 2000 to about 12,000 grams per mole.

Component (a) of the present invention can be prepared by any of several synthetic methods including those hereinafter described.

Synthetic Method 1: Reaction of a Polyol with a Polyisocyanate and then with a Hydrolysable Silane Containing Active Hydrogen Functional Group to Provide Non-Acrylic Polymer Containing at Least One Hydrolysable Silyl Group The above-mentioned hydroxy-functional polyols are converted into isocyanate-terminated prepolymers in known manner by reaction with polyisocyanates. These prepolymers are prepared by reacting an excess of polyisocyanate with a polyol or a combination of polyols usually in the presence of a catalyst.

The isocyanate-terminated prepolymer after the reaction of the polyol with the polyisocyanate has the general Formula (2)

$$R^1-[-(N=C=O)_a]_b \quad (2)$$

wherein $R^1$ and b have the aforestated meanings, and a is 1. It is understood that $R^1$ polymer fragment contains a urethane group as a result of the reaction of the polyol with an isocyanate group. According to one embodiment of the invention, isocyanate-terminated prepolymer is prepared by reacting diisocyanates with polyols at different ratios of NCO to OH that range specifically from about 1.1 to about 2.0, more specifically from about 1.4 to about 1.9 and most specifically from about 1.6 to about 1.8.

Suitable polyisocyanates include any from which polyurethane polymers can be prepared by the customary sequence of reaction with polyol to form a prepolymer. Useful diisocyanates include, for example, 2,4-toluene diisocyanate, 2,6-toluene diisocyanate, a mixture of 2,4- and 2,6-toluene diisocyanate isomers [most of the TDI from markets are the mixture], 4,4' diphenyl-methanediisocyanate, isophorone diisocyanate, dicyclohexylmethane-4,4'-diisocyanate, various liquid diphenylmethane-diisocyanates containing a mixture of 2,4- and 4,4' isomers, and the like, and mixtures thereof. In one embodiment of the present invention, the isocyanate functional monomer employed is an isophorone diisocyanate (IPDI) available from Bayer under the trade name Desmodur I D 230.

A catalyst may be used in the preparation of the above-mentioned isocyanate-terminated prepolymers. Suitable catalysts are metal salts or bases, and include the non-limiting examples of bismuth salts, such as bismuth trisneodecanoate and other bismuth carboxylates; zirconium compounds or aluminum compounds, such as zirconium chelates and aluminum chelates; dialkyltin dicarboxylates, such as dibutyltin dilaurate and dibutyltin acetate, tertiary amines, the stannous salts of carboxylic acids, such as stannous octoate and stannous acetate, and the like.

In a second process step, the isocyanate-terminated prepolymer of general Formula (2) is reacted with silane(s) that contain an active hydrogen functional group to prepare component (a). The silanes that contain an active hydrogen functional group are provided by the general Formula (3):

$$H-Y^1-R^2-SiX^1X^2X^3 \quad (3)$$

wherein $R^2$, $X^1$, $X^2$ and $X^3$ have the aforestated meanings, and each occurrence of $Y^1$ is independently selected from the group consisting of oxygen (—O—), sulfur (—S—), (—)$_2$NR$^3$, —NR$^3$(C=O)NR$^3$—, —NR$^3$(C=O)O— and —NR$^3$(C=O)S—, wherein $R^3$ is hydrogen, alkyl, alkenyl, arenyl, aralkyl or —R$^2$SiX$^1$X$^2$X$^3$ group, wherein each $R^3$, other than hydrogen, contains from 1 to 18 carbon atoms.

The silane terminating reactions of the present invention can be any kind as known in the art, e.g., those reactions disclosed in U.S. Pat. No. 6,197,912 and U.S. Pat. No. 5,990,257, the entire contents of which are incorporated herein by reference.

In one embodiment of the present invention, the active hydrogen organofunctional silanes include, e.g., primary and secondary amino-alkoxysilanes, ureidoalkoxysilane, carbamatosilane, thiocarbamatosilane and mercaptoalkoxysilanes. Representative examples of suitable aminosilanes include, but are not limited to N-phenyl-3-aminopropyltrimethoxysilane, N-methyl-3-aminopropyltrimethoxysilane, N-butyl-3-aminopropyltrimethoxy silane, 4-amino-3,3-dimethylbutyltrimethoxysilane, N-cyclohexyl-3-aminopropyltrimethoxysilane, dibutyl maleate adduct of 3-aminopropyltrimethoxy silane, dibutyl maleate adduct of 4-amino-3,3-dimethylbutyltrimethoxysilane, 3-aminopropyltriethoxysilane, bis-(3-trimethoxysilylpropyl) amine, 3-aminopropylmethyldimethoxysilane, 3-aminopropyldimethyl(methylethyloximato)silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)propyltrimethoxysilane, N-ethyl-4-amino-3,3 dimethylbutyldimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, 3-mercaptopropyltrimethoxysilane, 3-mercaptopropyltriethoxysilane, 3-mercaptopropylmethyldimethoxysilane, 3-ureidopropyltrimethoxysilane, 3-ureidopropylmethyldimethoxysilane, O-(3-trimethoyxsilylpropyl) carbamate and mixtures thereof.

Synthetic Method 2: Reaction of a Polyol with a Polyisocyanate, Then with an Unsaturated Compound Containing an Active Hydrogen Functional Group and Finally with a Hydrolysable Silane Containing an Si—H Group to Provide Non-Acrylic Polymer Containing at Least One Hydrolysable Silyl Group The above-mentioned hydroxy-functional polyols are converted into isocyanate-terminated prepolymers in known manner by reaction with polyisocyanates. These prepolymers are prepared by reacting an excess of polyisocyanate with a polyol or a combination of polyols usually in the presence of a catalyst.

The isocyanate-terminated prepolymer after the reaction of the polyol with the polyisocyanate has the general Formula (2)

$$R^1-[-(N=C=O)_a]_b \quad (2)$$

wherein $R^1$ and b have the aforestated meanings, and a is 1. It is understood that $R^1$ polymer fragment contains a urethane group as a result of the reaction of the polyol with an isocyanate group. According to one embodiment of the invention, isocyanate-terminated prepolymer is prepared by reacting diisocyanates with polyols at different ratios of NCO to OH that range specifically from about 1.1 to about 2.0, more specifically from about 1.4 to about 1.9 and most specifically from about 1.6 to about 1.8.

Suitable polyisocyanates include any from which polyurethane polymers can be prepared by the customary sequence of reaction with polyol to form a prepolymer. Useful diisocyanates include, for example, 2,4-toluene diisocyanate, 2,6-toluene diisocyanate, a mixture of 2,4- and 2,6-toluene diisocyanate isomers [most of the TDI from markets are the mixture], 4,4' diphenyl-methanediisocyanate, isophorone diisocyanate, dicyclohexylmethane-4,4'-diisocyanate, various liquid diphenylmethane-diisocyanates containing a mixture of 2,4- and 4,4' isomers, and the like, and mixtures thereof. In one embodiment of the present invention, the isocyanate functional monomer employed is an isophorone diisocyanate (IPDI) available from Bayer under the trade name Desmodur I D 230.

A catalyst may be used in the preparation of the above-mentioned isocyanate-terminated prepolymers. Suitable catalysts are metal salts or bases, and include the non-limiting examples of bismuth salts, such as bismuth trisneodecanoate and other bismuth carboxylates; zirconium compounds or aluminum compounds, such as zirconium chelates and aluminum chelates; dialkyltin dicarboxylates, such as dibutyltin dilaurate and dibutyltin acetate, tertiary amines, the stannous salts of carboxylic acids, such as stannous octoate and stannous acetate, and the like.

In a second process step, the isocyanate-terminated prepolymer of general Formula (2) is reacted with an unsaturated compound containing an active hydrogen functional group of the general Formula (4):

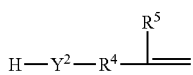
(4)

wherein $R^4$ is a divalent hydrocarbyl group consisting of from 1 to 10 carbon atoms selected from the group consisting of divalent alkylene, alkenylene, arenylene, arylene and aralkylene groups, and, optionally, contains at least one oxygen or nitrogen; $R^5$ is hydrogen or a monovalent hydrocarbyl containing from 1 to 9 carbon atoms selected from the group consisting of alkyl, arenyl, aryl and aralkyl, with the proviso that the sum of carbon atoms in $R^4$ and $R^5$ is less than or equal to 10; and, $Y^2$ is independently selected from the group consisting of oxygen (—O—), a substituted nitrogen, (—)$_2$NR$^3$, —NR$^3$(C=O)NR$^3$—, and —NR$^3$(C=O)O—, wherein $R^3$ is hydrogen, alkyl, alkenyl, arenyl, aralkyl or —R$^2$SiX$^1$X$^2$X$^3$ group, wherein each $R^3$, other than hydrogen, contains from 1 to 18 carbon atoms.

The resulting intermediate containing at least one ethylenically unsaturated group is provided by the general Formula (5):

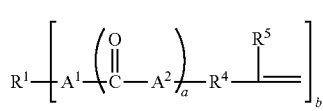
(5)

wherein $R^1$, $R^4$, $R^5$ and b have the aforestated meanings and each occurrence of $A^1$ and $A^2$ is independently selected from oxygen or substituted nitrogen of the structure (—)$_2$NR$^3$, where $R^3$ is hydrogen, alkyl, alkenyl, aryl aralkyl or the group —R$^2$SiX$^1$X$^2$X$^3$, wherein each $R^3$, other than hydrogen, contains from 1 to 18 carbon atoms, and with the proviso that when $A^1$ is oxygen, the $A^2$ is (—)$_2$NR$^3$ and a is 1.

The reactions conditions that can be used to form the ethylenic unsaturated compound of Formula (5) may include the use of catalysts described above for the preparation of the isocyanate-terminated prepolymer, reduced, ambient or elevated temperatures, the use of aprotic solvents and reduced, atmospheric or high pressures. Suitable temperatures are specifically in the range of 0 to about 150° C., more specifically from about 25 to about 100° C., and most specifically from about 60 to about 90° C. Typical pressures used in the preparation of the unsaturated prepolymer included the non-limiting range of about 0.1 mmHg to about 10 bars, more specifically from about 10 mmHg to about 2 bars and most specifically from about 600 mmHg to about 1 bar. Representative non-limiting examples of typical solvents in ethyl ether, tetrahydrofuran, ethylacetate, tolune, hexanes, cyclohexanes and the like.

In the final step, the ethylenically unsaturated prepolymer of Formula (5) is hydrosilated with hydrolysable hydridosilane of Formula (6):

$$HSiX^1X^2X^3 \quad (6)$$

wherein $X^1$, $X^2$ and $X^3$ have the aforestated meanings. Because the hydrosilation catalysts are poisoned by sulfur containing materials, the ethylenically unsaturated prepolymer of Formula (5) and (6) should be free of sulfur atoms. The conditions for hydrosilation of intermediates containing carbon-carbon double bonds is well known in the art, such as described in "Comprehensive Handbook of Hydrosilylation," B. Marciniec (ed), Pergamon Press, New York (1992), which is included in its entirety herein by reference.

Useful hydrolysable hydridosilanes include, for example, H—Si(OCH$_3$)$_3$, H—Si(OCH$_2$CH$_3$)$_3$, H—SiCH$_3$(OCH$_3$)$_3$, H—SiCH$_3$(OCH$_2$CH$_3$)$_2$, H—Si(CH$_3$)$_2$OCH$_3$, H—Si(CH$_3$)$_2$OCH$_2$CH$_3$, and the like.

Synthetic Method 3: Reaction of a Polyol with a Hydrolysable Silane Containing an Isocyanate Functional Group to Provide Non-Acrylic Polymer Containing at Least One Hydrolysable Silyl Group The above-mentioned hydroxyl-functional polyols are converted into component (a) in known manner by reaction with an isocyanate-functional silane. Component (a) is prepared by reacting a polyol or a combination of polyols usually in the presence of a catalyst with less than an equivalent to slightly more than an equivalent of hydrolysable silane containing an isocyanate group. In one embodiment, the ratio of —NCO to —OH is specifically from about 0.5 to about 1.1, more specifically from about 0.8 to about 1, and most specifically from about 0.95 to about 0.99. When the ratio of —NCO to —OH is less than 1, component (a) has residual hydroxyl groups, which may be advantages to improve adhesion to substrates and lower the modulus of cured component (a).

Suitable hydrolysable silanes containing an isocyanate-functional group for use in preparing components (a), of the present invention, have the general Formula (7):

$$OCN—R^2—SiX^1X^2X^3 \quad (7)$$

wherein $R^2$ is a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen and sulfur.

Specific hydrolysable silanes containing an isocyanate-functional group, as represented by general Formula (7), that are suitable for use herein include 3-isocyanatopropyltrimethoxysilane, 3-isocyanatoisopropyltrimethoxysilane, 4-isocyanatobutyltrimethoxysilane, 2-isocyanato-1,1-dimethylethyltrimethoxysilane, 3-isocyanatopropyltriethoxysilane, 3-isocyanatoisopropyltriethoxysilane, 4-isocyanatobutyltriethoxysilane, 2-isocyanato-1,1-dimethylethyltriethoxysilane, 2-thiocyanatoethyltrimethoxysilane, 3-thiocyanatopropyltriethoxysilane, 3-isocyanatopropylmethyldimethoxysilane, 3-isocyanatoisopropyldimethylmethoxysilane, 4-isocyanatobutylphenyldimethoxysilane, 2-(4-isocyanatophenyl)ethylmethyldimethoxysilane and the like.

Method 4: Reaction of Polyols with Ethylenically Unsaturated Halo-Compounds and then Silanes Containing an Si—H Group to Provide Non-Acrylic Polymer Containing at Least One Hydrolysable Silyl Group The above-mentioned hydroxy-functional polyols are converted into ethylenically unsaturated prepolymers in known manner by reaction with ethylenically unsaturated halo compounds. These prepolymers are prepared by reacting less than equivalent amounts of ethylenically unsaturated halo compounds with a polyol or a combination of polyols usually in the presence of a catalyst.

The ethylenically unsaturated halo compounds useful in the preparation of the ethylenically unsaturated polymers are provided by general Formula (8):

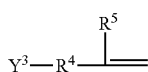
(8)

wherein $R^4$ and $R^5$ have the aforestated meanings and $Y^3$ is a halo atom, selected from the group consisting of Cl—, Br— and I—. The reaction conditions are well known in the art, as for example U.S. Pat. Nos. 3,951,888 and 3,971,751, the entire content of which are incorporated herein by reference.

Representative non-limiting examples of ethylenically unsaturated halo compounds, as represented by general Formula (8), include allyl chloride, allyl bromide, allyl iodide, methallyl chloride, methallyl bromide, 6-chlorohexene, chloromethylstyrene, and the like.

The unsaturated prepolymer after the reaction of the polyol with the ethylenically unsaturated compound has the general Formula (9):

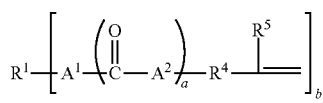
(9)

wherein $R^1$, $R^4$, $R^5$, $A^2$ and b have the aforestated meanings, $A^1$ is oxygen and a is 0.

In the final step, the ethylenically unsaturated prepolymer of Formula (9) is hydrosilated with hydrolysable hydridosilane of Formula (6):

$$HSiX^1X^2X^3 \quad (6)$$

wherein $X^1 X^2$ and $X^3$ have the aforestated meanings. Because the hydrosilation catalysts are poisoned by sulfur containing materials, the ethylenically unsaturated prepolymer (9) should be free of sulfur atoms. The conditions for hydrosilation of intermediates containing carbon-carbon double bonds is well known in the art, such as described in "Comprehensive Handbook of Hydrosilylation," B. Marciniec (ed), Pergamon Press, New York (1992), which is included in its entirety herein by reference.

Useful hydrolysable hydridosilanes include, but are not limited to H—Si(OCH$_3$)$_3$, H—Si(OCH$_2$CH$_3$)$_3$, H—SiCH$_3$ (OCH$_3$)$_3$, H—SiCH$_3$(OCH$_2$CH$_3$)$_2$, H—Si(CH$_3$)$_2$OCH$_3$, H—Si(CH$_3$)$_2$OCH$_2$CH$_3$, and the like.

In another embodiment, component (a) is provided by Formula (1) wherein $R^1$ is a silylated non-acrylic polymer specifically having a number average molecular weight from about 500 to about 25,000 grams per mole, more specifically from about 1,000 to about 20,000 grams per mole and most specifically from about 4,000 to about 12,000 grams per mole and a Tg from about −20 to about −80° C., more specifically from about −25 to about −40° C. and most specifically from about −30 to about −35° C.; $R^2$ is an alkylene or arylene of from 1 to 6 carbon atoms, more specifically from 1 to 3 carbon atoms and most specifically 3 carbon atoms; $A^1$ is oxygen or substituted nitrogen of the structure (—)$_2$NR$^3$, wherein $R^3$ is specifically hydrogen, alkyl or aryl, wherein each $R^3$, other than hydrogen, contains specifically 1 to 10 carbon atoms and more specifically, 1 to 6 carbon atoms; $A^2$ is substituted nitrogen of the structure (—)$_2$NR$^3$, wherein $R^3$ is specifically hydrogen, alkyl or aryl, wherein each $R^3$, other than hydrogen, contains specifically 1 to 10 carbon atoms and more specifically, 1 to 6 carbon atoms; $X^1$ and $X^2$ are methoxy, ethoxy or propoxy; and $X^3$ is methyl, methoxy, ethoxy or propoxy.

In one embodiment of the present invention, component (b) is an acrylic polymer containing at least one hydrolysable silyl group that is bonded to the acrylic polymer through a urethane linking group.

According to one specific embodiment of the present invention, the silylated acrylic polymer, i.e., component (b), has the general Formula (10):

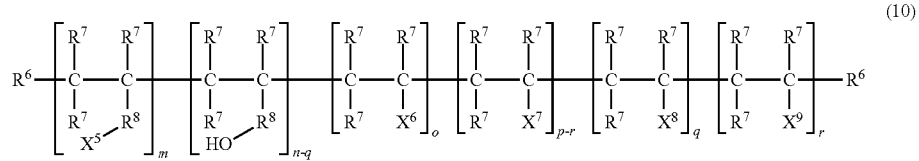
(10)

wherein:
$R^6$ is a hydrogen or monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;

each occurrence of $R^7$ is independently a hydrogen or monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;

each occurrence of $R^8$ is a covalent bond or divalent hydrocarbyl group containing from about 1 to 12 carbon atoms selected from the group consisting of a alkylene, arenylene, arylene and aralkylene, and, optionally, contains at least one heteroatom selected from the group consisting of oxygen, nitrogen and sulfur;

each occurrence of $X^5$ is independently an organic functional group selected from the group comprising carboxylate (—C(═O)O—), cyano (—CN), hydroxyl (OH), halo (Cl—, Br— and I—), phenyl (C$_6$H$_5$), and vinyl (—C(R$^5$)═CH$_2$), wherein $R^5$ has the aforestated meaning;

each occurrence of $X^6$ is independently a monovalent hydrocarbyl group containing an ester linking group, —C(═O)O—R$^9$, wherein each occurrence of $R^9$ is independently a monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;

each occurrence of $X^7$ is independently a monovalent hydrocarbyl group containing a hydroxyl and ester linking group, —C(=O)O—$R^{10}$—OH, wherein each occurrence of $R^{10}$ is independently a divalent hydrocarbylene group containing from about 1 to 12 carbon atoms selected from the group consisting of alkylene, arenylene, arylene and aralkylene, and, optionally, contains at least one heteroatom selected from the group consisting of oxygen, nitrogen and sulfur;

each occurrence of $X^8$ is independently a monovalent hydrocarbyl group containing a hydrolysable silyl group and a urethane linking group and having the general Formula (11):

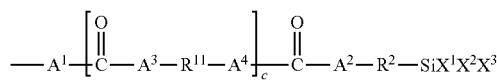

(11)

wherein $R^2$, $X^1$, $X^2$ and $X^3$ have the aforestated meanings; $R^{11}$ is a divalent hydrocarbylene group containing from 1 to 18 carbon atoms selected from the group consisting of alkylene, arenylene, arylene, and aralkylene and optionally, contains at least one heteroatom selected from the group consisting of oxygen, nitrogen and sulfur; $A^1$ is oxygen; $A^3$ and $A^4$ are —NH—, each $A^2$ is divalent oxygen, sulfur or substituted nitrogen of the structure (—)$_2$N$R^3$, wherein $R^3$ is hydrogen, alkyl, alkenyl, aryl aralkyl or —$R^2$Si$X^1X^2X^3$, wherein each $R^3$, other than hydrogen, contains from 1 to 18 carbon atoms, and with the proviso that when c is 0, $A^2$ is —NH—; each occurrence of $X^9$ is independently a monovalent hydrocarbonyl group containing a hydrolysable silyl group, an urethane group and an ester linking group and having the general Formula (12):

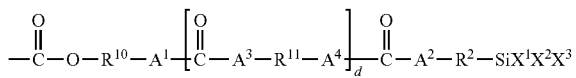

(12)

wherein $R^2$, $R^{11}$, $X^1$, $X^2$ and $X^3$ have the aforestated meanings; $R^{10}$ is a divalent hydrocarbyl group containing from about 1 to 12 carbon atoms selected from the group consisting of an alkylene, arenylene, arylene and aralkylene, and, optionally, contains at least one heteroatom selected from the group consisting of oxygen, nitrogen and sulfur; $A^1$ is oxygen; $A^3$ and $A^4$ are —NH—; each $A^2$ is divalent oxygen, sulfur or substituted nitrogen of the structure (—)$_2$N$R^3$, wherein $R^3$ is hydrogen, alkyl, alkenyl, aryl aralkyl or —$R^2$Si$X^1X^2X^3$, wherein each $R^3$, other than hydrogen, contains from 1 to 18 carbon atoms, and with the proviso that when d is 0, $A^2$ is —NH—; and each occurrence of c, d, m, n, o, p, q and r is an integer wherein c is 0 or 1; d is 0 or 1, m is 0 to about 500, n is 0 to about 500, o is 0 to about 500 and p is 0 to about 500, q is 0 to about 500 and r is 0 to about 500, with the proviso that the sum of q and r is greater than 1, q is less than or equal to n, and r is less than or equal to p.

In another embodiment of the invention, the silylated acrylic polymer is provided by Formula (10) wherein $R^7$ is specifically hydrogen or methyl and more specifically hydrogen; $R^8$ is a covalent bond; $R^9$ is an alkyl or aryl group specifically from about 1 to about 10 carbon atoms, more specifically from about 2 to about 8 carbon atoms and most specifically, from about 3 to about 6 carbon atoms; $R^{10}$ is an alkylene group containing specifically from about 1 to about 12 carbon atoms, more specifically from about 2 to about 8 carbon atoms and most specifically from about 3 to about 6 carbon atoms; $X^5$ is phenyl, cyano, chloro, carboxylate (—C(C=O)$_2$OH); m is from 0 to about 300, more specifically from about 10 to about 100 and most specifically from about 25 to about 50; n is 0 to about 300, more specifically from about 10 to about 100 and most specifically from about 25 to about 50; o is 0 to about 300, more specifically from about 10 to about 100 and most specifically from about 25 to about 50; and p is 0 to about 300, more specifically from about 10 to about 100 and most specifically from about 25 to about 50, q is 0 to 200, more specifically from 1 to 100 and most specifically from 5 to 50; r is 0 to 200, more specifically 1 to 100 and most specifically 5 to 50, with the proviso that the sum of q and r is equal to or greater than 1.

Component (b) of this invention can be prepared by any of several synthetic methods including those hereinafter described.

The term "hydroxyl containing acrylic polymer" as used herein refers to pendent and/or terminal hydroxyl-functional acrylic polymers or copolymers that are prepared from the monomers selected from the non-limiting group comprising esters of acrylic acid, such as 2-hydroxyethyl acrylate, 3-hydroxypropyl acrylate, 6-hydroxy-2-ethylhexyl acrylate, methyl acrylate, ethyl acrylate, butyl acrylate, 2-ethylhexyl acrylate, phenyl acrylate, and the like; esters of methacrylic acid such as 2-hydroxyethyl methacrylate, 3-hydroxypropyl methacrylate, 6-hydroxy-2-ethylhexyl methacrylate, methyl methacrylate, ethyl methacrylate, butyl methacrylate, 2-ethylhexyl methacrylate, phenyl methacrylate, and the like; ethylenically unsaturated acids, such as acrylic acid, methacrylic acid, 2-propenoic acid, 2-butenoic acid, 3-butenoic acid, 4-vinylbenzoic acid and the like; vinyl compounds containing an aryl group, such as styrene, 4-vinyltoluene, and the like; acrylonitrile; vinyl esters, such as vinyl acetate, vinyl propanoate, vinyl benzoate, and the like; substituted ethylenically unsaturated compounds, such as allyl alcohol, methallyl alcohol, allyl chloride, methallyl chloride, and the like.

The hydroxyl containing acrylic polymers of the present invention include, but are not limited to, copolymers of esters of acrylic or methacrylic acid and/or of esters of methacrylic acid, and/or styrene monomers, and/or acrylonitrile monomers, and/or vinyl acetate monomers. Useful hydroxyl containing acrylic polymers can be prepared by methods known in the art, such as those disclosed in U.S. Pat. No. 4,491,650, the entire contents of which are incorporated herein by reference.

In one embodiment of the invention, the hydroxyl containing acrylic polymers are described by the general Formula (13):

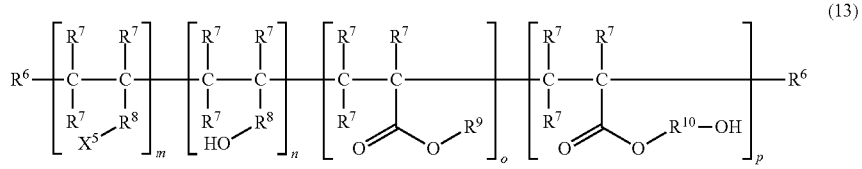

(13)

wherein:

R⁶ is a hydrogen or monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;

- each occurrence of $R^7$ is independently a hydrogen or monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;
- each occurrence of $R^8$ is independently a covalent bond or divalent hydrocarbyl group containing from about 1 to 12 carbon atoms selected from the group consisting of an alkylene, arenylene, arylene and aralkylene, and, optionally, contains at least one heteroatom selected from the group consisting of oxygen, nitrogen and sulfur;
- each occurrence of $R^9$ is independently a monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;
- each occurrence of $R^{10}$ is independently a divalent hydrocarbyl group containing from about 1 to 12 carbon atoms selected from the group consisting of an alkylene, arenylene, arylene and aralkylene, and, optionally, contains at least one heteroatom selected from the group consisting of oxygen, nitrogen and sulfur;
- each occurrence of $X^5$ is independently an organic functional group selected from the group comprising carboxylate (—C(=O)O—), cyano (—CN), hydroxyl (—OH), halo (Cl—, Br— and I—), phenyl (—C₆H₅), and vinyl (—C($R^5$)=CH₂), wherein $R^5$ has the aforestated meaning; and
- each occurrence of m, n, o and p is an integer wherein m is 0 to about 500, n is 0 to about 500, o is 0 to about 500 and p is 0 to about 500, with the proviso that the sum of o and p is greater than 1.

The hydroxyl containing acrylic polymer of the present invention can be prepared from at least one of the monomers selected from the group consisting of esters of acrylic acid, such as, 2-hydroxyethyl acrylate, 3-hydroxypropyl acrylate, 6-hydroxy-2-ethylhexyl acrylate, methyl acrylate, ethyl acrylate, butyl acrylate, 2-ethylhexyl acrylate, phenyl acrylate; esters of methacrylic acid such as 2-hydroxyethyl methacrylate, 3-hydroxypropyl methacrylate, 6-hydroxy-2-ethylhexyl methacrylate, methyl methacrylate, ethyl methacrylate, butyl methacrylate, 2-ethylhexyl methacrylate, phenyl methacrylate; ethylenically unsaturated acids, such as acrylic acid, methacrylic acid, 2-propenoic acid, 2-butenoic acid, 3-butenoic acid, 4-vinylbenzoic acid and the like; vinyl compounds containing an aryl group, such as styrene, 4-vinyltoluene; acrylonitrile; vinyl esters, such as vinyl acetate, vinyl propanoate, vinyl benzoate; substituted ethylenically unsaturated compounds, such as allyl alcohol, methallyl alcohol, allyl chloride and methallyl chloride.

Method 5. Reaction of Hydroxyl Containing Acrylate Polymers with Hydrolysable Silanes Containing an Isocyanate Functional Group to Provide Acrylic Polymer Containing at Least One Hydrolysable Silyl Group According to one specific embodiment of the invention, component (b) is prepared by reacting the hydroxyl acrylate polymer of Formula (13) with a hydrolysable silane containing an isocyanate functional group of Formula (7). The hydrolysable silane containing an isocyanate functional group is typically used at less than, equal to or slightly greater than stoichometric amounts. According to another embodiment, the ratio of —NCO to —OH is specifically from about 0.5 to about 1.1, more specifically from about 0.8 to about 1, and most specifically from about 0.95 to about 0.99. When the ratio of —NCO to —OH is less than 1, component (b) has residual hydroxyl groups, which may be advantageous to improve adhesion to substrates and lower the modulus of cured component (b).

Specific hydrolysable silanes containing an isocyanate-functional group, as represented by general Formula (7) that can be used herein include 3-isocyanatopropyltrimethoxysilane, 3-isocyanatoisopropyltrimethoxysilane, 4-isocyanatobutyltrimethoxysilane, 2-isocyanato-1,1-dimethylethyltrimethoxysilane, 3-isocyanatopropyltriethoxysilane, 3-isocyanatoisopropyltriethoxysilane, 4-isocyanatobutyltriethoxysilane, 2-isocyanato-1,1-dimethylethyltriethoxysilane, 2-thiocyanatoethyltrimethoxysilane, 3-thiocyanatopropyltriethoxysilane, 3-isocyanatopropylmethyldimethoxysilane, 3-isocyanatoisopropyldimethylmethoxysilane, 4-isocyanatobutylphenyldimethoxysilane, 2-(4-isocyanatophenyl)ethylmethyldimethoxysilane and the like.

According to one embodiment of the invention, the hydroxyl containing acrylate polymer is selected from a group having a Tg higher than 0° C., and in another embodiment higher than about 10° C. The number average molecular weight of the hydroxyl containing polymers used in the preparation of component (b) of the invention is specifically in the range from about 1,000 to about 50,000 grams per mole, and more specifically from about 2,500 to about 15,000 grams per mole. In one embodiment of the invention, the equivalent hydroxyl molecular weight of these hydroxyl containing polymers ranges specifically from about 200 to about 2,000 grams per mole, and more specifically from about 400 to about 1,000 in another embodiment.

Representative non-limiting examples of the hydroxyl containing acrylate polymers suitable for this invention are G-Cure 114BL80, G-Cure 196BL80, G-Cure 192BL80, G-Cure 869PWF50 and G-Cure 109A75 from Cognis; Acryloid AU-608, Paraloid UCD 685HS, Paraloid AU 1166 and Paraloid AU 608S from Rohm & Hass; Acryflow A-90, Acryflow A140, and Acryflow M100 from Lyondell; and Acrylamac HS 232-2350, Acrylamac HS 232-2314, Acrylamac HS 232-2365 from Hexion, and the like.

According to one embodiment of the present invention, a combination of different types of monomers can be used to prepare the hydroxyl containing acrylate polymers to achieve a desired Tg. The use of high Tg monomers will increase the modulus and hardness, where as, the use of low Tg monomers imparts toughness and flexibility. In another embodiment of the invention, only a portion of the esters of acrylic acid or methacrylic acid will contain hydroxyl-functional group.

According to one embodiment of the invention, the silylated acrylate polymer is prepared by reacting hydroxyl containing acrylate polymers directly with a hydrolysable silane containing an isocyanate functional group.

Method 6: Reaction of Hydroxyl Containing Acrylate Polymer with Polyisocyante and then with Hydrolysable Silane Containing an Active Hydrogen Functional Group to Provide Acrylic Polymer Containing at Least One Hydrolysable Silyl Group In another embodiment of the invention, the hydroxyl containing acrylate polymer of Formula (13) is reacted with a diisocyanate or polyisocyanate and then reacted with a hydrolysable silane containing an active hydrogen functional group to prepare the silylated acrylate polymer. The diisocaynates or polyisocyanates, that are used to prepare the silylated acrylate polymer, are the same as described herein above. In one specific embodiment of the invention, the preferred diisocyanates are toluene diisocyanate (Mondur TDi 80) and isophorone diisocyanate (IPDI) available from Bayer.

Optionally, the silylated acrylate polymer can comprise solvent up to about 40 weight percent, and preferably up to about 20%. The solvent can help to improve the compatibility of these polymers with component (a) and optionally component (c). Suitable non-limiting examples of solvents include n-butyl acetate, n-butyl acetate, methyl n-amyl ketone (MnAK), methyl ethyl ketone, PM acetate, xylene, ethyl benzene, toluene, aromatic 100 (HiSol10), conosol, Aliphatic Solvent 90, or the like.

According to one embodiment of the invention, silylated non-acrylic polymer, component (a), is present in an amount that ranges from about 5 to about 95 weight percent of the moisture-curable silylated polymer resin composition, and the silylated acrylate polymer, component (b), is present in an amount that ranges from about 5 to about 95 weight percent of the moisture-curable silylated polymer resin composition. According to another embodiment, the silylated non-acrylic polymer, component (a), is present in an amount that ranges from about 50 to about 85 weight percent of the moisture-curable silylated polymer resin composition, and the silylated acrylate polymer, component (b), is present in an amount that ranges from about 15 to about 50 weight percent of the moisture-curable silylated polymer resin composition. According to yet another embodiment, the silylated non-acrylic polymer, component (a), is present in an amount that ranges from about 60 to about 80 weight percent of the moisture-curable silylated polymer resin composition, and the silylated acrylate polymer, component (b), is present in an amount that ranges from about 20 to about 40 weight percent of the moisture-curable silylated polymer resin composition.

The invention further contemplates preparing the moisture-curable silylated polymer resin composition with a pre-mix of the polyols, described herein above, and hydroxyl containing acrylate polymer which is further reacted with hydrolysable silane containing an isocyanate functional group. Alternatively, polyol can be blended with hydroxyl containing acrylate polymer and then reacted with hydrolysable silane containing an isocyanate functional group. And still another alternative, the isocyanate-terminated prepolymer made from the non-acrylic polymer can be mixed with the isocyanate-terminated acrylic polymer and the mixture further reacted with the hydrolysable silane containing an active hydrogen group The optional hydrolysable silicon compounds, i.e., component (c), useful for preparing the moisture-curable silylated polymer resin of the present invention are known in the art. Suitable hydrolysable compounds include, but are not limited to, acid or base condensed tetraalkoxysilane, wherein the alkoxy group containing specially from 1 to about 6 carbon atoms and more specially from 2 to about 3; acid or based condensed hydrocarbyltrialkoxysilane, wherein the hydrocarbyl group is specially form 1 to about 8 carbon atoms, and more specially from 2 to 4 carbon atoms and the alkoxy group contains specially from 1 to about 6 carbon atoms and more specially from 2 to about 3; acid or base condensed mixture of tetralkoxysilanes and hydrocarbyltrialkoxysilanes and their condensation products, and those disclosed in U.S. Pat. Nos. 6,140,393; 6,271,331; 6,140,447; 6,245,834; and PCT patent WO99/54386, the entire contents of which are incorporated herein by reference.

Representative non-limiting examples are the condensation products of tetramethoxysilane, tetraethoxysilane, tetraisopropylsilane, methyltrimethoxysilane, methyltriethoxysilane, isobutyltriethoxysilane, and co-condensation product made from the mixture of methyltriethoxysilane and isobutyltriethoxysilane.

Other optional components of the moisture-curable silylated polymer resin composition are those know in the art, such as, for example, filler, UV stabilizer, antioxidant, catalyst, adhesion promoter, cure accelerator, thixotropic agent, plasticizer, moisture scavenger, pigment, dye, surfactant, solvent and biocide.

Typical fillers suitable for formulation of the moisture-curable silylated polymer resin composition of the present invention include, for example, reinforcing fillers such as fumed silica, precipitated silica and calcium carbonates and the like. The plasticizers customarily employed in the moisture-curable silylated polymer resin composition of the present invention can also be used in the invention to modify the properties and to facilitate use of higher filler levels. Exemplary plasticizers include phthalates, diproplyene and diethylene glycol dibenzoates, alkylsulphonate phenols, alkyl phenathres, alkyl/diaryl phosphates and mixtures thereof and the like. The moisture-curable silylated polymer resin composition of the present invention can include various thixotropic or anti-sagging agents. Various castor waxes, fumed silica, treated clays and polyamides typify this class of additives. Stabilizers can be incorporated into the moisture-curable silylated polymer resin composition of this invention include, for example, hindered amine and dialkydydroxyamine. Adhesion promoters are useful in the moisture-curable composition of the present invention, e.g., alkoxysilane adhesion promoters. Suitable cure catalysts for timely curing (crosslinking) of the moisture-curable silylated polymer resin composition can be achieved with the use of various metal complexes of tin, titanium, zirconium and the like.

The moisture-curable silylated polymer resin composition of the present invention can include other additives typically employed for coating, adhesive and sealant applications. These additives would include solvents, pigments or other colorants, dyes, surfactant, fungicides and biocides. Such components may be employed in conventional amounts. Coating formulations would include additives as described for moisture-curable silylated polymer resin composition, though in different proportions than sealant or adhesive formulations, and typically include solvents and defoamers as examples.

A better understanding of the present invention and of its many advantages will be had by referring to the following specific examples, given by way of illustration.

EXAMPLE 1

The silylated non-acrylic polymer was prepared by charging Acclaim 8200 (400 grams, 0.05 mole, available from Bayer and having Mn of 8000 and OH no. of 14) to a resin kettle and with agitation, sparging with nitrogen at 80° C. until the moisture content reduced to 200 ppm or less. The temperature of the kettle was then cooled down to 45±5° C. upon the addition of IPDI (5.60 grams, 0.025 mole, available from Bayer). The catalyst, Fomrez SUL-4, (7 ppm, available from Chemtura Co.) was added 5 minutes later. The mixture was then heated to 75° C. and was maintained at 75±2° C. while stirring under a nitrogen blanket, for the condensation reaction. The NCO content was checked using the n-dibutylamine titration method and was monitored approximately every 0.5 hrs. After reaching the theoretically capping position, 3-isocyanatopropyltrimethoxysilane, Silquest A-Link 35 (10.26 grams, 0.05 mole, available from Momentive Performance Materials), was added in, the reactions proceeded at the same temperature until completion, as determined by titration. The resulted silylated non-acrylic polymer had viscosity of 45,000 cP at 25° C.

In a three-neck reaction kettle, hydroxyl containing acrylic polymer, G-Cure 114LB80, (200 grams, 0.21 mole of equivalent OH group, available from Cognis) and 3-isocyanatopropyltriethoxysilane, Silquest A-Link 25 (52.06 grams, 0.21 mol, available from Momentive Performance Materials) were charged and the temperature raised to 60° C. was and maintained for four hours under a nitrogen blanked. The finished product was free of any detectable isocyanate (—NCO) by titration and had a viscosity of 62,300 cP at 25 C.

The silylated non-acrylic polymer (80 grams) and the silylated acrylate polymer (20 grams) were mixed in a Speed Mixer for two minutes. The mixture was a clear liquid having viscosity of 51,000 cP. One percent of Formrez UL11(A) (available from Chemtura Co.) was added and mixed for another minute. The resin was cast into a film and cured under 50% Relative Humidity and 25° C. for a week. The mechanical properties were tested according to ASTM D 412 and C 661. The test results are presented in Table 1.

EXAMPLE 2

The moisture-curable silylated polymer resin composition was prepared by mixing the silylated non-acrylic polymer prepared in Example 1 (70 grams), with the silylated acrylate polymer (30 grams) prepared in Example 1 in a Speed Mixer for two minutes. The mixture was a clear liquid having viscosity of 60,000 cP. One percent of Formrez UL11(A) was added and mixed for another minute. The resin was cast into a film and cured under 50% Relative Humidity and 25° C. for a week. The mechanical properties were tested according to ASTM D 412 and C 661. The test results are presented in Table 1.

EXAMPLE 3

Into a three-neck reaction kettle, were charged hydroxyl containing acrylic polymer, G-Cure 114LB80 (200 grams 0.21 mole of equivalent OH group, available from Cognis) and of 3-isocyanatopropyltriethoxysilane (36.44 grams, 0.15 mol, available as A-Link 25 from Momentive Performance Materials) After the exotherm had subsided, Coscat 83, a bismuth catalyst from Coschem Co., (5 ppm) was added and the temperature was raised and maintained at 60° C. for two hours under a nitrogen blanked. The finished product was free of detectable isocyanate (—NCO) by titration and had a viscosity of 63,500 cP at 25° C. This silylated acrylate polymer (20 grams) was mixed with silylated non-acrylic polymer, prepared in Example 1, (80 grams) in a Speed Mixer for two minutes. The mixture was a clear liquid having viscosity of 63,000 cP. One percent of Fomrez UL11(A) was added and mixed for another minute. The resin was cast into a film and cured under 50% Relative Humidity and 25° C. for a week. The mechanical properties were tested according to ASTM D 412 and C 661. The test results are presented in Table 1.

EXAMPLE 4

The silylated non-acrylic polymer prepared in Example 1 (70 grams), and the silylated acrylate polymer prepared in Example 3 (30 grams) were mixed in a Speed Mixer for two minutes. The mixture was a clear liquid having viscosity of 75,000 cP. One percent of Fomrez UL11(A) was added and mixed for another minute. The resin was cast into a film and cured under 50% Relative Humidity and 25° C. for a week. The mechanical properties were tested according to ASTM D 412 and C 661. The test results are presented in Table 1.

EXAMPLE 5

A hydroxyl containing acrylatic polymer, G-Cure 114BL 80 (200 grams, 0.21 mole) was mixed with Mondur TDI 80 (36.7 grams, 0.21 mole, available from Bayer) at 50° C. After the exotherm had subsided, Coscat 83, a bismuth catalyst from Coschem Co. (5 ppm) was added. The reaction was kept at 50° C. under a nitrogen blanked until the NCO content was reduced to zero as determined by titration. Then an aminosilane, Silquest A Link 15, (48.9 grams, 0.22 mole, available from Momentive Performance Materials) was added. The reaction continued at the same condition until the NCO was reduced to zero. The finish production has viscosity of 150,000 cP at 25 C.

This silylated acrylate polymer (10 grams) and silylated non-acrylic polymer prepared in Example 1 (90 grams) were mixed in a Speed Mixer for two minutes. The mixture was a clear liquid. One percent of Fomrez UL11(A) was added and mixed for another minute. The resin was cast into a film and cured under 50% Relative Humidity and 25° C. for a week. The mechanical properties were tested according to ASTM D 412 and C 661. The test results are presented in Table 1.

Comparative Example 1 was prepared contained only the silylated non-acrylic polymer of Example 1.

Comparative Example 2 was prepared contained only the silylated acrylic polymer of Example 1.

TABLE 1

|  | Viscosity of the resin blends, cP at 25° C. | Tensile strength at break, psi | Young's Modulus, psi | Elongation at break, % | Hardness Shore A |
|---|---|---|---|---|---|
| Comparative Example 1 | 45,000 | 81.6 | 79 | 210 | 17 |
| Comparative Example 2 | 92,000 | 550 | 2924 | 20.5 | 53 |

TABLE 1-continued

| | Viscosity of the resin blends, cP at 25° C. | Tensile strength at break, psi | Young's Modulus, psi | Elongation at break, % | Hardness Shore A |
|---|---|---|---|---|---|
| Example 1 | 51,000 | 270 | 300 | 170 | 32 |
| Example 2 | 60,000 | 683 | 1190 | 146 | 42 |
| Example 3 | 63,100 | 265 | 217 | 231 | 27 |
| Example 4 | 75,000 | 583 | 897 | 176 | 33 |
| Example 5 | 60,000 | 128 | 186 | 120 | 30 |

The data as presented in Table 1 indicates that moisture curable silylated polymer resin compositions of Examples 1-5 showed improved mechanical properties, i.e., increased tensile strength, modulus and hardness, while retaining flexibility as indicated by elongation greater than 100%. Furthermore, the low viscosity of Examples 1-5 make them useful in commercial applications were flowable properties on the uncured composition are required. When only the acrylic polymer containing at least hydrolysable silyl group is used, the cured composition is brittle, as indicated by elongation of only 20%. The optimum performance is obtained when both the silylated non-acrylic polymer and the silylated acrylic polymer are used.

EXAMPLE 6

The silylated non-acrylic polymer prepared in Example 1 (70 grams), and 20 gram of the silylated acrylate polymer prepared in Example 3 were mixed in a Speed Mixer for two minutes. A hydrolysable silicon compound, Silquest R272, (10 grams, available from Momentive Performance) was added and blended on the Speed Mixer for additional two minutes. The mixture was a hazy and milky liquid. One percent of Fomrez UL11(A) was added and mixed for another minute. The resin blend was cast into a film and cured under 50% Relative Humidity and 25° C. for a week. The mechanical properties were tested according to ASTM D 412 and C 661. The test results are presented in Table 2.

EXAMPLE 7

The silylated non-acrylic polymer prepared in Example 1 (60 grams) and silylated acrylate prepared in Example 3 (20 grams) were mixed in a Speed Mixer for two minutes. Then, Silquest R272 (20 grams, available from Momentive Performance Materials) was added and blended on the Speed Mixer for additional two minutes. The mixture was a hazy and milky liquid. One percent of Fomrez UL11(A) was added and mixed for another minute. The resin blend was cast into a film and cured under 50% Relative Humidity and 25° C. for a week. The mechanical properties were tested according to ASTM D 412 and C 661. The test results are presented in the table below.

EXAMPLE 8

The silylated non-acrylic polymer prepared in Example 1 (60 grams) and silylated acrylic polymer prepared in Example 3 (10 grams), were mixed in a Speed Mixer for two minutes. Then, Silquest R272 (30 grams, available from Momentive Performance Materials) was added and blended on the Speed Mixer for additional two minutes. The mixture was a hazy and milky liquid. One percent of Fomrez UL11(A) was added and mixed for another minute. The resin blend was cast into a film and cured under 50% Relative Humidity and 25° C. for a week. The mechanical properties were tested according to ASTM D 412 and C 661. The test results are presented in the Table 2.

EXAMPLE 9

The silylated non-acrylic polymer prepared in Example 1 (60 grams) and the silylated acrylic polymer prepared in Example 3 (30 grams) were mixed in a Speed Mixer for two minutes. Then, Silquest R272 (10 grams, available from Momentive Performance Materials) was added and blended on the Speed Mixer for additional two minutes. The mixture was a hazy and milky liquid. One percent of Fomrez UL11(A) was added and mixed for another minute. The resin blend was cast into a film and cured under 50% Relative Humidity and 25° C. for a week. The mechanical properties were tested according to ASTM D 412 and C 661. The test results are presented in the table below.

TABLE 2

| | Tensile strength at break, psi | Young's Modulus, psi | Elongation at break, % | Hardness Shore A |
|---|---|---|---|---|
| Comparative Example 1 | 81.6 | 79 | 210 | 17 |
| Example 6 | 861 | 951 | 166 | 40 |
| Example 7 | 1544 | 1791 | 138 | 51 |
| Example 8 | 799 | 973 | 114 | 42 |
| Example 9 | 1484 | 2140 | 138 | 40 |

The above data showed the resin properties are significantly enhanced when components (a) and (b) are combined with component c. The hydrolysable silicon compound acts as an additional crosslinker that improved the modulus and hardness, while maintaining the flexibility of the resin.

EXAMPLE 10

The silylated non-acrylic polymer and silylated acrylic polymer can have different $X^1$, $X^2$ and $X^3$, such a methoxy groups and ethoxy groups for the silylated non-acrylic and acrylic polymers, respectively. Into a three-neck reaction kettle was charged hydroxyl functional acrylic polymer, G-Cure 114LB80, (200 grams, 0.21 mole of equivalent OH group) and heated to 60° C. 3-Isocyanatopropyltrimethoxysilane, Silquest A-Link 35 (43.2 grams, 0.21 mole, available from Momentive Performance Materials) was added and stirred for 4 hours at 80° C. under a nitrogen blanket. The product did not have any detectable NCO by titration and a viscosity of 91,000 cP at 25° C.

The silylated acrylic polymer (20 grams) was mixed with the silylated non-acrylic polymer of Example 1 (80 grams) for 2 minutes on a Speed Mixer. The mixture was a clear liquid with a viscosity of 51,000 cP. One percent of Formrez UL11(a) was added and mixed for another minute. The resin blend was cast into a film and cured under 50% Relative Humidity and 25° C. for a week. The mechanical properties were tested according to ASTM D 412 and C 661. The test results are presented in the Table 3 below.

TABLE 3

| | Viscosity, cP | Tensile strength at break, psi | Young's Modulus, psi | Elongation at break, % | Hardness Shore A |
|---|---|---|---|---|---|
| Example 1 | 51,000 | 270 | 300 | 170 | 32 |
| Example 10 | 56,000 | 196 | 172 | 166 | 30 |

Example 1 where the alkoxysilyl groups for the silylated non-acrylic and silylated acrylic were methoxy and ethoxy, respectively, had higher tensile strength and modulus while maintaining % elongation, when compared with Example 10, where the alkoxysilyl groups were the same.

EXAMPLE 11

Sealants were prepared from the moisture curable silylated polymer resin composition of Example 4 and the silylated non-acrylic in Example 1. The sealant formulation is given in Table 4.

TABLE 4

| Component | Comp. Ex. 2 Ingredient weight, g | Example 11 Ingredient weight, g | Supplier |
|---|---|---|---|
| Silylated non-acrylic from Ex. 1 | 39.36 | | |
| Curable silylated resin from Ex. 4 | | 39.36 | |
| Plasticizer (DIDP) | 15.74 | 15.74 | Exxon-Mobile |
| Silquest A-171 | 0.59 | 0.59 | Momentive |
| Ultra Pflex | 23.62 | 23.62 | Specialty Mineral |
| Hi Pflex | 15.74 | 15.74 | Specialty Mineral |
| Tinuvin 213 | 0.39 | 0.39 | CIBA |
| Tinuvin 622L | 0.39 | 0.39 | CIBA |
| TS720 | 2.36 | 2.36 | DeGussa |
| TiO$_2$ | 1.18 | 1.18 | DuPont |
| Silquest A-1120 | 0.59 | 0.59 | Momentive |
| Formrez SUL 4 | 0.02 | 0.02 | Chemtura |

The ingredients were mixed using a planetary mixer and cured for two weeks at 25° C. and 50% Relative Humidity. The cured sealants were then placed into an oven set at 120° C. for 5 weeks. The Comparative Example 2 turned brown, developed surface cracks and became harder after two weeks. Example 11 was unchanged after 5 weeks.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

What is claimed is:

1. A moisture-curable silylated polymer resin composition comprising:
   a) non-acrylic polymer containing at least one hydrolysable silyl group having the general Formula (1):

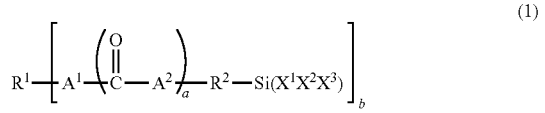

(1)

wherein:
   $R^1$ is independently a monovalent or polyvalent organic polymer fragment having a number average molecular weight of from about 500 to about 25,000 grams/mole;

$R^2$ is independently a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;

$A^1$ is independently selected from divalent oxygen (—O—), sulfur (—S—) or substituted nitrogen of the structure (—)$_2$NR$^3$, wherein R$^3$ is hydrogen, alkyl, alkenyl, arenyl, aryl, aralkyl or —R$^2$SiX$^1$X$^2$X$^3$ group, wherein each R$^3$, other than hydrogen, contains from 1 to 18 carbon atoms, and with the provisos that when A$^1$ is oxygen or sulfur, then A$^2$ is (—)$_2$NR$^3$ and when a is 0, then A$^1$ is oxygen;

$A^2$ is independently selected from divalent oxygen (—O—), sulfur (—S—) or substituted nitrogen of the structure (—)$_2$NR$^3$, wherein R$^3$ is hydrogen, alkyl, alkenyl, arenyl, aryl, aralkyl or —R$^2$SiX$^1$X$^2$X$^3$ group, wherein each R$^3$, other than hydrogen, contains from 1 to 18 carbon atoms, and with the provisos that when A$^2$ is oxygen or sulfur, then A$^1$ is (—)$_2$NR$^3$;

$X^1$ is independently selected from the group consisting of RO—, RC(=O)O—, R$_2$C=NO—, and R$_2$NO— wherein each R is independently selected from the group consisting of hydrogen, alkyl, alkenyl, arenyl, aryl, and aralkyl groups, wherein each R, other than hydrogen, contains from 1 to 18 carbon atoms, and, optionally, contains at least one oxygen or sulfur atom;

$X^2$ and $X^3$ is independently selected from the group consisting of RO—, RC(=O)O—, R$_2$C=NO—, R$_2$NO— and R wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom; and, each occurrence of subscripts a and b is independently an integer wherein a is 0 or 1 and b is 1 to 6;

b) silylated acrylate polymer having the general Formula (10):

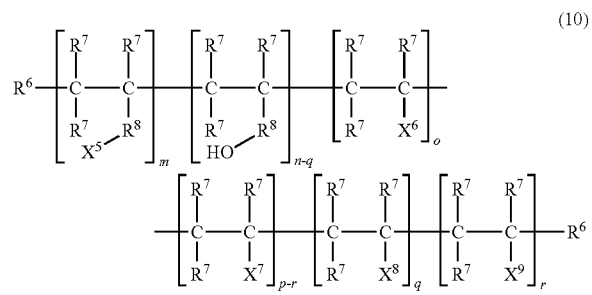

(10)

wherein:
   each occurrence of $R^6$ is independently a hydrogen or monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;

each occurrence of $R^7$ is independently a hydrogen or monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and sulfur;

each occurrence of $R^8$ is a covalent bond or divalent hydrocarbyl containing from about 1 to 12 carbon atoms selected from the group consisting of an alkylene, arenylene, arylene and aralkylene;

each occurrence of $X^5$ is independently an organic functional group selected from the group consisting of —C(=O)O—, —CN, —OH, Cl—, Br—, I— and —$C_6H_5$;

each occurrence of $X^6$ is independently a monovalent hydrocarbyl group containing an ester linking group, —C(=O)O—$R^9$, wherein each occurrence of $R^9$ is independently a monovalent hydrocarbyl group containing from about 1 to 12 carbon atoms selected from the group consisting of alkyl, arenyl, aryl and aralkyl, and, optionally, contains at least one heteroatom selected from the group consisting of oxygen, nitrogen and;

each occurrence of $X^7$ is independently a monovalent hydrocarbyl group containing a hydroxyl and ester linking group, —C(=O)O—$R^{10}$—OH, wherein each occurrence of $R^{10}$ is independently a divalent hydrocarbylene containing from about 1 to 12 carbon atoms selected from the group consisting of alkylene, arenylene, arylene and aralkylene, and, optionally, contains at least one heteroatom selected from the group consisting of oxygen, nitrogen and sulfur;

each occurrence of $X^8$ is independently a monovalent hydrocarbyl group containing a hydrolysable silyl group and a urethane linking group and having the general Formula (11):

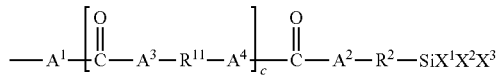

(11)

wherein $R^2$, $X^1$, $X^2$ and $X^3$ have the aforestated meanings; $R^{11}$ is a divalent hydrocarbylene containing from 1 to 18 carbon atoms selected from the group consisting of alkylene, arenylene, arylene, and aralkylene and optionally, contains at least one heteroatom selected from the group consisting of oxygen, nitrogen and sulfur; $A^1$ is oxygen; $A^3$ and $A^4$ are —NH—, each $A^2$ is divalent oxygen, sulfur or substituted nitrogen of the structure (—)$_2NR^3$, wherein $R^3$ is hydrogen, alkyl, alkenyl, aryl aralkyl or —$R^2SiX^1X^2X^3$, wherein each $R^3$, other than hydrogen, contains from 1 to 18 carbon atoms, and with the proviso that when c is 0, $A^2$ is —NH—;

each occurrence of $X^9$ is independently a monovalent hydrocarbyl group containing a hydrolysable silyl group, an urethane group and an ester linking group and having the general Formula (12):

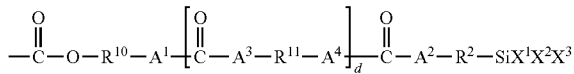

(12)

wherein $R^2$, $R^{11}$, $X^1$, $X^2$ and $X^3$ have the aforestated meanings; each occurrence of $R^{10}$ is a divalent hydrocarbyl group containing from about 1 to 12 carbon atoms selected from the group consisting of a alkylene, arenylene, arylene and aralkylene, and, optionally, contains at least one heteroatom selected from the group consisting of oxygen, nitrogen and sulfur; $A^1$ is oxygen; $A^3$ and $A^4$ are —NH—; each $A^2$ is divalent oxygen, sulfur or substituted nitrogen of the structure (—)$_2NR^3$, wherein $R^3$ is hydrogen, alkyl, alkenyl, aryl aralkyl or —$R^2SiX^1X^2X^3$, wherein each $R^3$, other than hydrogen, contains from 1 to 18 carbon atoms, and with the proviso that when d is 0, $A^2$ is —NH—; and each occurrence of c, d, m, n, o, p, q and r is an integer wherein c is 0 or 1; d is 0 or 1, m is 0 to about 500, n is 0 to about 500, o is 0 to about 500 and p is 0 to about 500, q is 0 to about 500 and r is 0 to about 500, with the proviso that the sum of q and r is greater than 1, q is less than or equal to n, and r is less than or equal to p, wherein the silylated acrylate polymer (b) is compatible with component (a) to form liquid resins at room temperature; and optionally, c) hydrolysable silicon compound.

2. The composition of claim 1 wherein the non-acrylic polymer, component (a), is prepared by at least one of the following:

i) reacting at least one polyol with at least one polyisocyanate to form an isocyanate-terminated prepolymer and reacting said prepolymer with at least one hydrolysable silane containing at least one active hydrogen functional group;

ii) reacting at least one polyol with at least one polyisocyanate to form an isocyanate-terminated prepolymer and reacting said prepolymer with at least one unsaturated compound containing at least one active hydrogen functional group and reacting the compound formed therein with at least one hydrolysable silane containing at least one Si—H group;

iii) reacting at least one polyol with at least one hydrolysable silane containing at least one isocyanate functional group; and iv) reacting at least one polyol with at least one ethylenically unsaturated halo-compound and reacting the compound formed therein with at least one hydrolysable silane containing at least one Si—H group.

3. The composition of claim 2 wherein the isocyanate-terminated prepolymer has the general Formula (2):

(2)

wherein $R^1$ is a monovalent or polyvalent organic polymer fragment having a number average molecular weight of from about 500 to about 25,000 grams/mole, b is 1 to 6 and a is 1, with the proviso that $R^1$ polymer fragment contains a urethane group as a result of the reaction of the polyol with an isocyanate group.

4. The composition of claim 2 wherein the hydrolysable silane containing at least one active hydrogen functional group has the general Formula (3):

(3)

wherein $R^2$ is a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;

$X^1$ is selected from the group consisting of RO—, RC(=O)O—, $R_2C$=NO—, and $R_2NO$— wherein each R is independently selected from the group consisting of hydrogen, alkyl, alkenyl, arenyl, aryl, and aralkyl, wherein each R, other than hydrogen, contains from 1 to 18 carbon atoms and, optionally, contains at least one oxygen or sulfur atom;

$X^2$ and $X^3$ are selected from the group consisting of RO—, RC(=O)O—, $R_2$C=NO—, $R_2$NO— and R wherein each R is independently selected from the group consisting of hydrogen, alkyl, alkenyl, arenyl, aryl, and aralkyl, wherein each R, other than hydrogen, contains from 1 to 18 carbon atoms and, optionally, contains at least one oxygen or sulfur atom; and $Y^1$ is selected from the group consisting of oxygen (—O—), sulfur (—S—), (—)$_2NR^3$, wherein $R^3$ is hydrogen, alkyl, alkenyl, arenyl, aralkyl or —$R^2SiX^1X^2X^3$ group, wherein each $R^3$, other than hydrogen, contains from 1 to 18 carbon atoms, —$NR^3$(C=O)$NR^3$—, —$NR^3$(C=O)O— and —$NR^3$(C=O)S—.

5. The composition of claim 2 wherein the hydrolysable silane containing at least one Si—H group has the general Formula (6);

$$HSiX^1X^2X^3 \quad (6)$$

wherein $X^1$ is selected from the group consisting of RO—, RC(=O)O—, $R_2$C=NO—, and $R_2$NO— wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom; and, $X^2$ and $X^3$ are selected from the group consisting of RO—, RC(=O)O—, $R_2$C=NO—, $R_2$NO— and R, wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom.

6. The composition of claim 2 wherein the hydrolysable silane containing at least one isocyanate functional group has the general Formula (7):

$$OCN-R^2-SiX^1X^2X^3 \quad (7)$$

wherein $R^2$ is independently a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;

$X^1$ is independently selected from the group consisting of RO—, RC(=O)O—, $R_2$C=NO—, and $R_2$NO— wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom; and, $X^2$ and $X^3$ is independently selected from the group consisting of RO—, RC(=O)O—, $R_2$C=NO—, $R_2$NO— and R wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom.

7. The composition of claim 2 wherein the unsaturated compound containing at least one active hydrogen functional group has the general Formula (4):

(4)

wherein:

$R^4$ is a divalent hydrocarbyl group containing from 1 to 10 carbon atoms selected from the group consisting of divalent alkylene, alkenylene, arenylene, arylene and aralkylene, and, optionally, containing at least one oxygen or nitrogen;

$R^5$ is hydrogen or a monovalent hydrocarbyl containing from 1 to 9 carbon atoms selected from the group consisting of alkyl, arenyl, aryl and aralkyl, with the proviso that the sum of carbon atoms in $R^4$ and $R^5$ is less than or equal to 10; and, $Y^2$ is selected from the group consisting of oxygen (—O—), (—)$_2NR^3$, —$NR^3$(C=O)$NR^3$— and —$NR^3$(C=O)O—, wherein $R^3$ is hydrogen, alkyl, alkenyl, arenyl, aralkyl or —$R^2SiX^1X^2X^3$ group, wherein each $R^3$, other than hydrogen, contains from 1 to 18 carbon atoms.

8. The composition of claim 3 wherein the ethylenically unsaturated halo compound has the general Formula (8):

(8)

wherein:

$R^4$ is a divalent hydrocarbyl group containing from 1 to 10 carbon atoms selected from the group consisting of divalent alkylene, alkenylene, arenylene, arylene and aralkylene, and, optionally, contains at least one oxygen or sulfur;

$R^5$ is independently hydrogen or a monovalent hydrocarbyl containing from 1 to 9 carbon atoms selected from the group consisting of alkyl, arenyl, aryl and aralkyl, with the proviso that the sum of carbon atoms in $R^4$ and $R^5$ is less than or equal to 10; and, $Y^3$ is at least one halo atom selected from the group consisting of Cl—, Br— and I—.

9. The composition of claim 1 wherein the silylated acrylic polymer, component (b), is prepared by at least one of the following:

a) reacting at least one hydroxyl containing acrylate polymer with at least one hydrolysable silane containing at least one isocyanate functional group; and, b) reacting at least one hydroxyl containing acrylate polymer with at least one polyisocyanate and reacting the compound formed therein with at least one hydrolysable silane containing at least one active hydrogen functional group.

10. The composition of claim 9 wherein hydroxyl containing acrylate polymer has the general Formula (13):

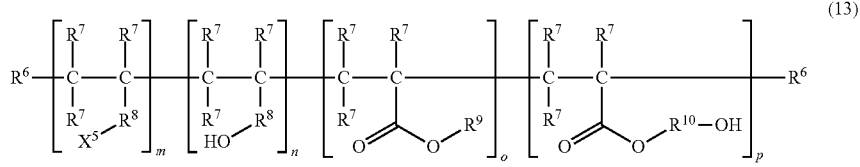

wherein:
- R⁶ is independently a hydrogen or monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
- R⁷ is independently a hydrogen or monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
- R⁸ is a covalent bond or divalent hydrocarbyl group containing from 1 to 12 carbon atoms selected from the group consisting of an alkylene, arenylene, arylene and aralkylene;
- R⁹ is independently a monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
- R¹⁰ is a divalent hydrocarbyl group containing from 1 to 12 carbon atoms selected from the group consisting of a alkylene, arenylene, arylene and aralkylene, and, optionally, contains at least one heteroatom selected from the group consisting of oxygen, nitrogen and sulfur;
- X⁵ is independently an organic functional group selected from the group comprising —C(═O)O—, —CN, —OH, —Cl, —Br, —I, and —C₆H₅; and,
- each occurrence of m, n, o and p is an integer wherein m is 0 to about 500, n is 0 to about 500, o is 0 to about 500 and p is 0 to about 500, with the proviso that the sum of o and p is greater than 1.

11. The composition of claim 10 wherein the hydroxyl containing acrylic polymer is prepared from at least one monomer-selected from the group consisting of 2-hydroxyethyl acrylate, 3-hydroxypropyl acrylate, 6-hydroxy-2-ethylhexyl acrylate, methyl acrylate, ethyl acrylate, butyl acrylate, 2-ethylhexyl acrylate, phenyl acrylate, 2-hydroxyethyl methacrylate, 3-hydroxypropyl methacrylate, 6-hydroxy-2-ethylhexyl methacrylate, methyl methacrylate, ethyl methacrylate, butyl methacrylate, 2-ethylhexyl methacrylate, phenyl methacrylate, acrylic acid, methacrylic acid, 2-propenoic acid, 2-butenoic acid, 3-butenoic acid, 4-vinylbenzoic acid, styrene, 4-vinyltoluene, acrylonitrile, vinyl acetate, vinyl propanoate, vinyl benzoate, allyl alcohol, methallyl alcohol, allyl chloride and methallyl chloride.

12. The composition of claim 9 wherein the hydrolysable silane containing at least one isocyanate functional group has the general Formula (7):

$$OCN-R^2-SiX^1X^2X^3 \quad (7)$$

wherein R² is independently a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;
- X¹ is independently selected from the group consisting of RO—, RC(═O)O—, R₂C═NO—, and R₂NO— wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom; and,
- X² and X³ is independently selected from the group consisting of RO—, RC(═O)O—, R₂C═NO—, R₂NO— and R wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom.

13. The composition of claim 9 wherein the polyisocyanate is at least one selected from the group consisting of 2,4-toluene diisocyanate, 2,6-toluene diisocyanate, 4,4'-diphenylmethane diisocyanate, isophorone diisocyanate, dicyclohexylmethane-4,4'-diisocyanate, diphenylmethane diisocyanates and isophorone diisocyanate.

14. The composition of claim 9 wherein the hydrolysable silane containing at least one active hydrogen functional group has the general Formula (3):

$$H-Y^1-R^2-SiX^1X^2X^3 \quad (3)$$

wherein, R² is a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;
- X¹ is selected from the group consisting of RO—, RC(═O)O—, R₂C═NO— and R₂NO—, wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom;
- X² and X³ are selected from the group consisting of RO—, RC(═O)O—, R₂C═NO—, R₂NO— and R, wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom; and
- Y¹ is selected from the group consisting of oxygen (—O—), sulfur (—S—), (—)₂NR³, —NR³(C═O)NR³—, —NR³(C═O)O— and —NR³(C═O)S— wherein R³ is hydrogen, alkyl, alkenyl, arenyl, aralkyl or —R²SiX¹X²X³ group, wherein each R³, other than hydrogen, contains from 1 to 18 carbon atoms.

15. The composition of claim 1 wherein $R^7$ is hydrogen or methyl; $R^8$ is a covalent bond; $R^9$ is an alkyl or aryl group from 1 to about 10 carbon atoms; $R^{10}$ is an alkylene group containing from 1 to about 12 carbon atoms; $X^5$ is —$C_6H_5$, —CN, —Cl or —C(=O)O—; m is from about 10 to about 100; n is 0 to about 300; o is 0 to about 300; and p is 0 to about 300; q is 0 to 200; r is 0 to 200, with the proviso that the sum of q and r is equal to or greater than 1.

16. The composition of claim 1 wherein the composition contains at least one hydrolysable silicon compound, component (c).

17. The composition of claim 16, wherein the hydrolysable silicon compound, component (c), is at least one selected from the group consisting of acid or base condensed tetraalkoxysilane, wherein the alkoxy group contains from 1 to about 6 carbon atoms; acid or base condensed hydrocarbyltrialkoxysilane, wherein the hydrocarbyl group contains from 1 to about 8 carbon atoms and the alkoxy group contains from 1 to about 6 carbon atoms; acid or base condensed mixture of tetralkoxysilanes and hydrocarbyltrialkoxysilanes and their condensation products.

18. The composition of claim 1 wherein component (a) is present in an amount that ranges from about 5 to about 95 weight percent and component (b) is present in an amount that ranges from about 5 to about 95 weight percent of the total composition.

19. The composition of claim 1 wherein component (a) is present in an amount that ranges from about 50 to about 85 weight percent and component (b) is present in an amount that ranges from about 15 to about 50 weight percent of the total composition.

20. The composition of claim 1 wherein component (a) has glass transition temperature of not more than about −20° C.

21. The composition of claim 1 wherein component (b) has a glass transition temperature of at least about 1° C.

22. The composition of claim 1 wherein component (b) has a glass transition temperature of at least about 10° C.

23. The composition of claim 1 wherein component (a) contains at least one methoxysilyl group and component (b) contains at least one ethoxysilyl group.

24. The composition of claim 1 wherein the silylated acrylate polymer (b) further comprises solvent up to about 40 weight percent.

25. The composition of claim 1 wherein silylated acrylate polymer (b) further comprises solvent up to about 20 weight percent.

26. The composition of claim 1 further comprising a solvent selected from the group consisting of n-butyl acetate, methyl n-amyl ketone, PM acetate, xylene, ethyl benzene, aromatic 100 (HiSo110), toluene, aliphatic solvent 90 and mixtures thereof.

27. A process for making moisture-curable silylated polymer resin of claim 1 comprising:
(i) blending non-acrylic polymer containing at least one hydrolysable silyl group (a) with a hydroxyl acrylate polymer of Formula (13):

wherein
$R^6$ is independently a hydrogen or monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
$R^7$ is independently a hydrogen or monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
$R^8$ is a covalent bond or divalent hydrocarbyl group containing from 1 to 12 carbon atoms selected from the group consisting of an alkylene, arenylene, arylene and aralkylene;
$R^9$ is independently a monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
$R^{10}$ is a divalent hydrocarbyl group containing from 1 to 12 carbon atoms selected from the group consisting of a alkylene, arenylene, arylene and aralkylene, and, optionally, contains at least one heteroatom selected from the group consisting of oxygen, nitrogen and sulfur;
$X^5$ is independently an organic functional group selected from the group consisting of carboxylate (—C(=O)O—), cyano (—CN), hydroxyl (—OH), —Cl, —Br, —I, and phenyl ($C_6H_5$); and,
each occurrence of m, n, o and p is an integer wherein m is 0 to about 500, n is 0 to about 500, o is 0 to about 500 and p is 0 to about 500, with the proviso that the sum of o and p is greater than 1; and,
(ii) reacting the composition formed in step (i) with at least one hydrolysable silane containing at least one isocyanate functional group selected from the group consisting of 3-isocyanatopropyltrimethoxysilane, 3-isocyanatoisopropyltrimethoxysilane, 4-isocyanatobutyltrimethoxysilane, 2-isocyanato-1,1-dimethylethyltrimethoxysilane, 3-isocyanatopropyltriethoxysilane, 3-isocyanatoisopropyltriethoxysilane, 4-isocyanatobutyltriethoxysilane, 2-isocyanato-1,1-dimethylethyltriethoxysilane, 2-thiocyanatoethyltrimethoxysilane, 3-thiocyanatopropyltriethoxysilane, 3-isocyanatopropylmethyldimethoxysilane, 3-isocyanatoisopropyldimethylmethoxysilane, 4-isocyanatobutylphenyldimethoxysilane, 2-(4-isocyanatophenybethylmethyldimethoxysilane and wherein the ratio of NCO to —OH is specifically from about 0.5 to about 1.1, to provide for the moisture-curable silylated polymer resin.

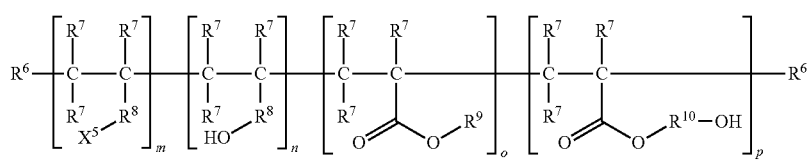

(13)

28. A process for making moisture-curable silylated polymer resin of claim 1 comprising:
   a) blending at least one isocyanate-terminated prepolymer having the general Formula (2)

$$R^1-[-(N=C=O)_a]_b \quad (2)$$

wherein $R^1$ is a monovalent or polyvalent organic polymer fragment, a is 1 and b is 1 to 6, with the proviso that $R^1$ polymer fragment contains a urethane group, with the compound formed by reacting a hydroxyl containing acrylate polymer of Formula (13):

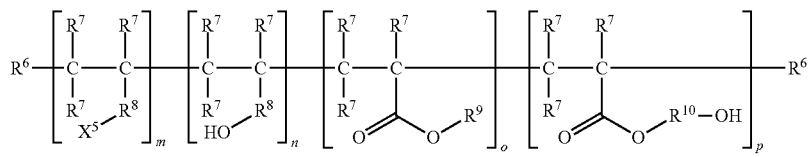

wherein
   $R^6$ is independently a hydrogen or monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
   $R^7$ is independently a hydrogen or monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
   $R^8$ is a covalent bond or divalent hydrocarbyl group containing from 1 to 12 carbon atoms selected from the group consisting of an alkylene, arenylene, arylene and aralkylene;
   $R^9$ is independently a monovalent hydrocarbyl group containing from 1 to 12 carbon atoms selected from the group consisting of alkyl, arenyl, aryl and aralkyl, and, optionally, contains at least one heteroatom selected from the group consisting of oxygen, nitrogen and sulfur;
   $R^{10}$ is a divalent hydrocarbyl group containing from 1 to 12 carbon atoms selected from the group consisting of a alkylene, arenylene, arylene and aralkylene, and, optionally, contains at least one heteroatom selected from the group consisting of oxygen, nitrogen and sulfur;
   $X^5$ is independently an organic functional group selected from the group consisting of carboxylate (—C(=O) O—), cyano (—CN), hydroxyl (—OH), —Cl, —Br, —I, and phenyl ($C_6H_5$); and,
   each occurrence of m, n, o and p is an integer wherein m is 0 to about 500, n is 0 to about 500, o is 0 to about 500 and p is 0 to about 500, with the proviso that the sum of o and p is greater than 1, with an isocyanatosilane selected from the group consisting of 3-isocyanatopropyltrimethoxysilane, 3-isocyanatoisopropyltrimethoxysilane, 4-isocyanatobutyltrimethoxysilane, 2-isocyanato-1,1-dimethylethyltrimethoxysilane, 3-isocyanatopropyltriethoxysilane, 3-isocyanatoisopropyltriethoxysilane, 4-isocyanatobutyltriethoxysilane, 2-isocyanato-1,1-dimethylethyltriethoxysilane, 2-thiocyanatoethyltrimethoxysilane, 3-thiocyanatopropyltriethoxysilane, 3-isocyanatopropylmethyldimethoxysilane, 3-isocyanatoisopropyldimethylmethoxysilane, 4-isocyanatobutylphenyldimethoxysilane, 2-(4-isocyanatophenyl)ethylmethyldimethoxysilane and wherein the ratio of —NCO to —OH is from about 0.5 to about 1.1; and,
   b) reacting the composition formed in (a) with at least one hydrolysable silane containing at least one active hydrogen functional group having Formula (3):

$$H-Y^1-R^2-SiX^1X^2X^3 \quad (3)$$

wherein:
   $R^2$ is independently a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;
   $X^1$ is independently selected from the group consisting of RO—, RC(=O)O—, $R_2$C=NO—, and $R_2$NO— wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom; and,
   $X^2$ and $X^3$ is independently selected from the group consisting of RO—, RC(=O)O—, $R_2$C=NO—, $R_2$NO— and R wherein each R is independently selected from the group consisting of hydrogen, alkyl, alkenyl, arenyl, aryl, and aralkyl groups, wherein each R, other than hydrogen, contains from 1 to 18 carbon atoms and, optionally, contains at least one oxygen or sulfur atom,
   each occurrence of $Y^1$ is independently selected from the group consisting of oxygen (—O—), sulfur (—S—), (—)$_2$N$R^3$, —N$R^3$(C=O)N$R^3$—, —N$R^3$(C=O)O— and —N$R^3$(C=O)S—, wherein $R^3$ is hydrogen, alkyl, alkenyl, arenyl, aralkyl or —$R^2$Si$X^1X^2X^3$ group, and each $R^3$, other than hydrogen, contains from 1 to 18 carbon atoms, to provide for the moisture-curable silylated polymer resin composition.

29. The composition obtained by curing the moisture-curable silylated polymer resin composition of claim 1.

30. The composition obtained by curing the moisture-curable silylated polymer resin obtained by the process of composition claim 27.

31. The composition obtained by curing the moisture-curable silylated polymer resin obtained by the process of composition claim 28.

32. An adhesive comprising the composition of claim 1.

33. A sealant comprising the composition of claim 1.

34. A coating comprising the composition of claim 1.

* * * * *